(12) United States Patent
Kadashevich et al.

(10) Patent No.: US 11,176,185 B2
(45) Date of Patent: *Nov. 16, 2021

(54) TOPIC GENERATION FOR A PUBLICATION

(71) Applicant: International Business Machines Corporation, Armonk, NY (US)

(72) Inventors: A. Julie Kadashevich, Tyngsboro, MA (US); Jane B. Marcus, Medford, MA (US); Jessica L. Stevens, Pelham, NH (US); Purvi K. Trivedi, Littleton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 16/384,157

(22) Filed: Apr. 15, 2019

(65) Prior Publication Data

US 2019/0243849 A1 Aug. 8, 2019

Related U.S. Application Data

(63) Continuation of application No. 15/009,900, filed on Jan. 29, 2016, now Pat. No. 10,324,968.

(51) Int. Cl.
*G06F 17/30* (2006.01)
*G06F 7/00* (2006.01)
(Continued)

(52) U.S. Cl.
CPC ........ *G06F 16/3344* (2019.01); *G06F 16/285* (2019.01); *G06F 16/345* (2019.01);
(Continued)

(58) Field of Classification Search
CPC .. G06F 16/3344; G06F 16/285; G06F 16/345; G06F 40/284; G06F 40/30; G06Q 10/10; G06Q 50/01; H04L 51/16
(Continued)

(56) References Cited

U.S. PATENT DOCUMENTS 7,007,235 B1 * 2/2006 Hussein ............. H04L 12/1822
715/751
7,523,085 B2 * 4/2009 Nigam ................. G06F 40/253
706/55

(Continued)

OTHER PUBLICATIONS

"Content Generation Based on Persona Filtration"; IP.com; IP.com No. IPCOM000207346D; IP.com Publication Date: May 26, 2011; 4 Pages.

(Continued)

*Primary Examiner* — Pavan Mamillapalli
(74) *Attorney, Agent, or Firm* — Cantor Colburn LLP; Michael O'Keefe

(57) ABSTRACT

An aspect of topic generation includes parsing communications conducted by users through an application. The communications include a communication generated by a sender and response communications received from recipients in reply to the communication generated by the sender. An aspect also includes identifying keywords and indications of sentiment from the parsed communications, determining a focus of the communication generated by the sender based on the keywords identified from the parsing, and formulating a topic for a publication based on criteria including a frequency of occurrence of the keywords in the parsed communications, a threshold level of the indications of sentiment that appear in the parsed communications, and/or a number of the communications containing one or more of the keywords having corresponding timestamps that fall within a threshold period of time. An aspect further includes submitting the topic for publication to the sender.

20 Claims, 3 Drawing Sheets

(51) Int. Cl.
  *G06F 16/33*    (2019.01)
  *H04L 12/58*    (2006.01)
  *G06F 16/28*    (2019.01)
  *G06F 16/34*    (2019.01)
  *G06Q 10/10*    (2012.01)
  *G06Q 50/00*    (2012.01)
  *G06F 40/30*    (2020.01)
  *G06F 40/284*   (2020.01)

(52) U.S. Cl.
  CPC ............ *G06F 40/284* (2020.01); *G06F 40/30* (2020.01); *G06Q 10/10* (2013.01); *G06Q 50/01* (2013.01); *H04L 51/16* (2013.01)

(58) Field of Classification Search
  USPC ........................................................ 707/730
  See application file for complete search history.

(56) References Cited

U.S. PATENT DOCUMENTS

| | | | | |
|---|---|---|---|---|
| 7,640,304 | B1 * | 12/2009 | Goldscheider | G06Q 10/10 709/204 |
| 8,296,152 | B2 * | 10/2012 | Issa | H04M 11/04 704/275 |
| 8,738,363 | B2 * | 5/2014 | Brun | G06F 40/295 704/9 |
| 8,775,429 | B2 * | 7/2014 | Choudhary | G06Q 30/0201 707/738 |
| 9,177,060 | B1 * | 11/2015 | Bennett | G06F 16/951 |
| 9,251,530 | B1 * | 2/2016 | Dachis | G06Q 30/0242 |
| 9,294,576 | B2 * | 3/2016 | Lange | G06F 3/04817 |
| 9,319,486 | B2 * | 4/2016 | Sbaiz | H04L 67/22 |
| 9,330,174 | B1 * | 5/2016 | Zhang | G06F 16/95 |
| 10,430,420 | B2 * | 10/2019 | Galvin, Jr. | G06F 16/24578 |
| 2009/0292526 | A1 | 11/2009 | Harari et al. | |
| 2010/0042910 | A1 | 2/2010 | Manolescu et al. | |
| 2010/0311030 | A1 * | 12/2010 | He | G09B 7/02 434/350 |
| 2012/0102050 | A1 * | 4/2012 | Button | G06F 16/9535 707/749 |
| 2012/0167010 | A1 | 6/2012 | Campbell et al. | |
| 2012/0179751 | A1 * | 7/2012 | Ahn | G06Q 30/0282 709/204 |
| 2012/0185779 | A1 * | 7/2012 | Dugan | G06Q 30/0282 715/739 |
| 2013/0085745 | A1 | 4/2013 | Koister et al. | |
| 2013/0138749 | A1 | 5/2013 | Bohm et al. | |
| 2013/0325992 | A1 * | 12/2013 | McGann | H04L 51/046 709/206 |
| 2014/0025692 | A1 | 1/2014 | Pappas | |
| 2014/0040370 | A1 * | 2/2014 | Buhr | H04L 67/306 709/204 |
| 2015/0356571 | A1 * | 12/2015 | Chang | H04L 51/32 705/7.29 |
| 2017/0220675 | A1 | 8/2017 | Kadashevich et al. | |

OTHER PUBLICATIONS

List of IBM Patents or Patent Applications Treated as Related; Appendix P Filed Apr. 15, 2019; 2 Pages.

* cited by examiner

TOPIC GENERATION FOR A PUBLICATION

CROSS REFERENCE TO RELATED APPLICATIONS

This application is a Continuation Application of U.S. Non-Provisional application Ser. No. 15/009,900, filed Jan. 29, 2016, which is incorporated herein by reference in its entirety.

BACKGROUND

The invention relates generally to data processing, and more specifically, to generating a topic for a publication based on a user's current work.

Many people have useful ideas and information and want to share that information through a publication service, such as a web log ("blog"). Finding the time to brainstorm ideas for a publication can be a prohibitive factor to authors. A publication that does not offer followers some new content on a frequent basis may not be successful.

SUMMARY

According to an embodiment a method, system, and computer program product for topic generation for a publication. A method includes parsing communications conducted by users through an application. The communications include a communication generated by a sender and response communications received from recipients in reply to the communication generated by the sender. The method also includes identifying keywords, timestamps, and indications of sentiment from the parsed communications through natural language processing, determining a focus of the communication generated by the sender based on the keywords identified from the parsing, and formulating a topic for a publication based on criteria including a frequency of occurrence of the keywords in the parsed communications, a threshold level of the indications of sentiment that appear in the parsed communications, and/or a number of the communications containing one or more of the keywords having corresponding timestamps that fall within a threshold period of time. The method further includes submitting the topic for publication to the sender.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Embodiments described herein are directed to topic generation for a publication. As individuals today are pulled in many different directions to work on a variety of topic areas throughout the work week, it can be challenging to remember what one has worked on two or three weeks ago that might be of interest to readers of the publication. For authors with little time to write, having a topic which is centered around his/her current focus area, along with possible content, would facilitate the writing process and enable the author to write a quality publication. The topic generation for publication analyzes the author's current work and suggests publication topics and content based on the author's current focus. The process monitors the author's primary applications used for work, such as email, instant messaging, and social communities, to learn the author's current focus and suggests publication topics and content.

To facilitate the identification of topics that might spark interest in readers, the system may key in on emoticons or text replies received by the user from others (e.g., "thanks," "that was very helpful," etc.) that indicate interest in the topic. In some embodiments, the system may use sentiment analysis, such as IBM WATSON in order to analyze received replies to determine whether there has been a favorable response, thereby indicating that the topic could be more widely interesting as a topic for publication.

Figure 1:
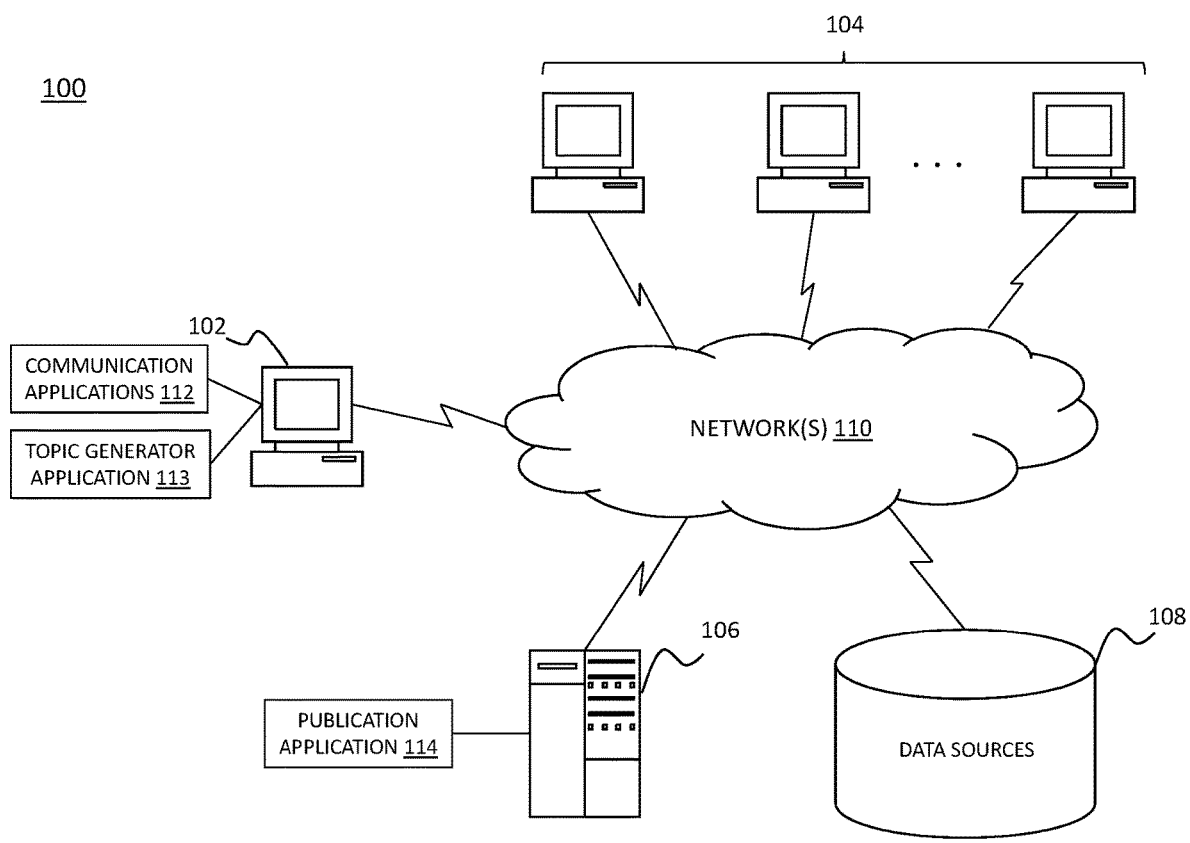
FIG. 1 depicts a block diagram of a system for topic generation for a publication in accordance with an embodiment.

Turning now to FIG. 1, a block diagram of a system 100 for topic generation for publication processes will now be described in accordance with an embodiment. The system 100 includes user devices 102-104, a server computer 106, and a storage device 108, each of which is communicatively coupled to one or more network(s) 110.

In one embodiment, the user device 102 may be operated by a user (e.g., an employee) who is part of an organization or enterprise that is managed through another individual or group of individuals via computer systems (e.g., server computer 106) in a work environment. The user devices 104 may be operated by peers, co-workers, or other individuals associated with the user device 102 who share information and communicate with the user device 102, e.g., over one or more of the networks 110. The user devices 102-104 may be implemented as personal computers (e.g., desktop, laptop) or may be portable devices (e.g., smart phone, tablet computer, personal digital assistant, etc.). Applications that may be implemented by the user devices 102-104 include, e.g., a standard and/or mobile web browser, an email client application, an instant messaging application, a social media application, a textual and/or a graphical user interface, a customized web browser, a plugin, an Application Programming Interface (API), and/or a custom application. Collectively, the email client application, instant messaging application, and social media application are referred to herein as communication applications 112.

In addition, the user device 102 implements a topic generator application 113. The topic generator application 113 processes communication activities associated with the communication applications 112, and determines a potential topic for a publication that may be of interest to those who read publications authored by the user. The topic generator application 113 may be implemented as middleware, e.g., residing between the user device's operating system and the communication applications 112. The topic generator application 113 implements at least a portion of the exemplary processes described herein.

The server computer 106 may be implemented as a high-speed computer processing device capable of handling the volume of activities conducted among user devices, such as user devices 102-104. The server computer 106 may provide a publication service (e.g., a web log, or "blog" service) to users of the service. In an embodiment, the server computer 106 enables users to create and author publications (e.g., blogs) for dissemination to other individuals, such as individuals operating user devices 104. The server computer 106 may implement a publication application 114 to provide this publication service to users. In an alternative embodiment, at least a portion of the functionality of the publication application 114 may reside on the user device 102.

The storage device 108 may be implemented as a plurality of compartmentalized network data sources that provide various types of information in response to searches. Using a search engine, the information in the data sources can be accessed by user network entities. For example, in an embodiment, the topic generator application 113 may search the data sources (e.g., storage device 108) for topics that may be used as candidates for a publication. In addition, content resulting from the searches may be provided to the user along with an associated topic of publication.

The storage device 108 may be implemented using a variety of devices for storing electronic information. The storage device 108 may be logically addressable as a consolidated data source across a distributed environment that includes one or more networks, such as network(s) 110. Information stored in the storage device 108 is retrieved and manipulated via the user device 102, e.g., via the topic generator application 113.

Figure 3:
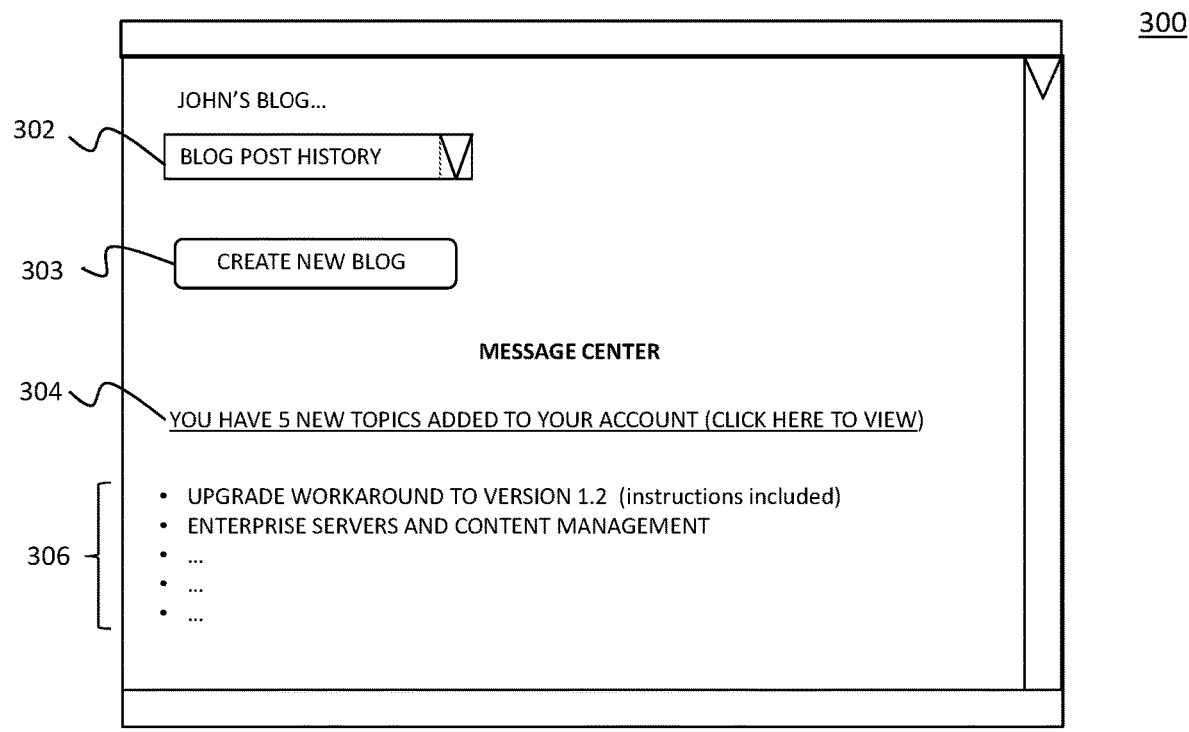
FIG. 3 depicts a user interface computer screen in accordance with an embodiment.

In an embodiment, the server computer 106 receives suggested topics of publication for a particular user and may present these topics to the user when the user logs in to the publication application 114. As shown in FIG. 3, e.g., a user interface screen 300 includes a message center that includes a notification mechanism that indicates to the user when the topic generator application 113 identifies a new topic for publication. The user can select the notification as a link 304 to view the topics. As shown in FIG. 3, a list of topics 306 is presented for the user. In an embodiment, the server computer 106 implements a blog service for users who author various content for publication. In this example, the publications authored by the user may be referred to as blogs.

The networks 108 may be any type of known networks including, but not limited to, a wide area network (WAN), a local area network (LAN), a global network (e.g. Internet), a virtual private network (VPN), and an intranet. The networks 108 may be implemented using wireless networks or any kind of physical network implementation known in the art, e.g., using cellular, satellite, and/or terrestrial network technologies. The networks 108 may also include short range wireless networks utilizing, e.g., BLUETOOTH™ and WI-FI™ technologies and protocols.

Figure 2:
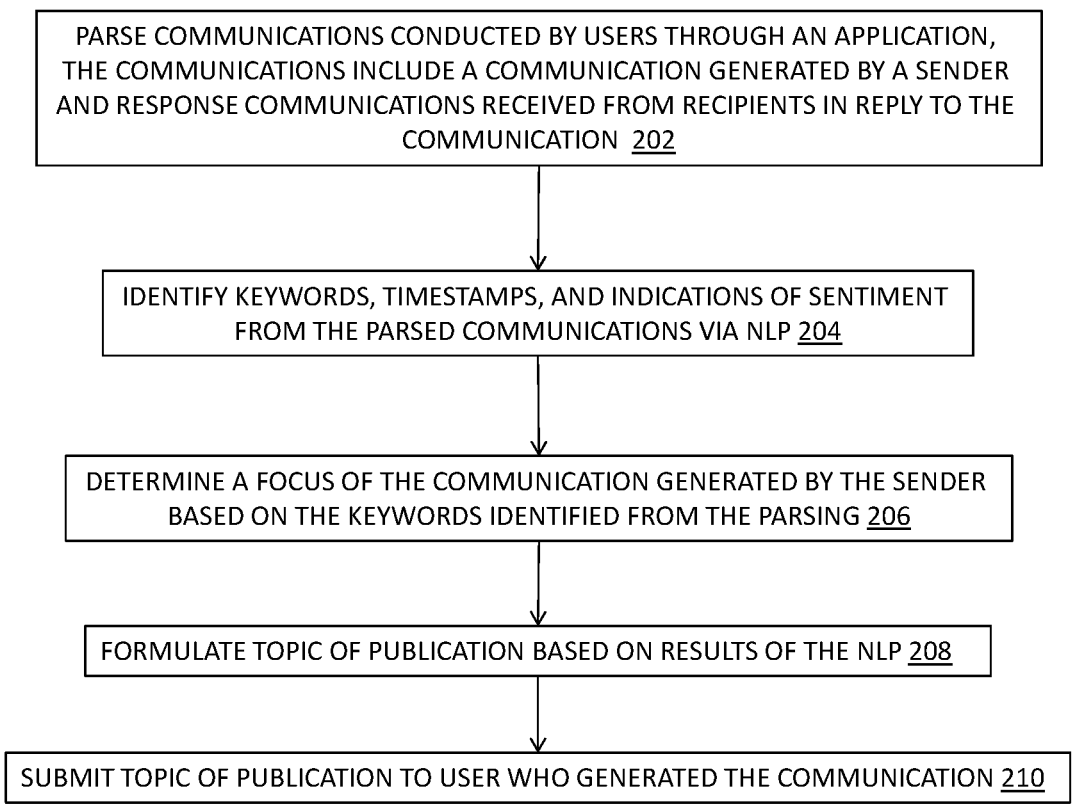
FIG. 2 depicts a flow diagram of a process for topic generation for a publication in accordance with an embodiment.

Turning now to FIG. 2, a flow diagram describing the topic generator for publication processes will now be described in an embodiment. In block 202, communications conducted by users through an application are monitored by the topic generator application 113. For example, the communications may be implemented through one or more of an email application, instant messaging application, social networking application, etc. (e.g., communication applications 112). The communications include a communication generated by a sender and response communications received from recipients in reply to the communication generated by the sender.

In block 204, natural language processing techniques are applied to the parsed communications conducted by the users, and keywords, timestamps, and indications of sentiment are identified therefrom. Indications of sentiment may include pre-defined terms and phrases that express emotion, as well as emoticons, and various punctuation (e.g., exclamations, question marks, hashtags, etc.).

In block 206, a focus of the communication generated by the sender is determined based on the keywords identified from the parsing. For example, a focus can be determined based on a frequency of occurrence of certain words or phrases, a title or subject line in a communication, or other means.

In block 208, the topic generator application 113 formulates a suggested topic for publication based on criteria, such as one or more of: a frequency of occurrence of one or more of the keywords in the parsed communications, a threshold level of the indications of sentiment that appear in the parsed communications, and a number of the communications containing one or more of the keywords having corresponding timestamps that fall within a threshold period of time.

In block 210, the topic generator application 113 submits the topic for publication to the sender of the communication. In an embodiment, the topic for publication includes a candidate subject for a blog that is under authorship by the user. The topic for publication may be provided to the user device 102, or alternatively, it may be presented to the user via the server computer 106 (e.g., through the publication application 114) over one or more networks 110. Content for the post may also be suggested by the topic generator application 113.

In an embodiment, the topic generator application 113 may monitor communications across multiple different applications (e.g., communications applications 112), parse these communications, and classify the parsed communications according to time (timestamp) and/or thread.

As indicated above, the sentiment may include emoticons and pre-defined terms and phrases that express emotion. The topic generator application 113 applies a weight to the keywords that are determined to be associated with the indications of sentiment, such that selection of the topic for publication is influenced by the keywords based on the corresponding weight. For example, suppose 10 out of 18 response communications include a positive emotional expression (e.g., "thanks!" or "that's interesting!"). The subject or topic features identified in these communications can be weighted higher than other response communications that are directed to a different topic and have fewer positive expressions.

In a further embodiment, the topic generator application 113 may utilize external data sources to search for content or supplemental information that may be used in conjunction with a topic for publication. In this embodiment, the topic generator application 113 searches at least one data source (e.g., storage device 108) for keywords and submits to the user content corresponding to the search results.

Turning now to FIG. 3, a user interface screen 300 with sample data will now be described. The screen 300 may provide an option 302 for the user to view or search publication history (e.g., all previously published blogs), as well as to create a new blog via option 303. As indicated above, the user may also be presented with a message center that displays a link 304 to new topics, which are displayed in a listing 306 as shown in FIG. 3.

Technical effects and benefits include the ability to analyze an author's current work and suggest publication topics and content based on the author's current focus. The process monitors the author's primary applications used for work, such as email, instant messaging, and social communities, to learn the author's current focus and suggests publication topics and content.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   parsing network communications conducted among users wherein the network communications comprise a dialog-based communication generated by a sender and dialog-based response communications received from recipients in reply to the communication generated by the sender;
   identifying keywords and indications of sentiment from the parsed communications, wherein the indications of sentiment are identified from the dialog-based response communications and reflect a reaction to content expressed in the dialog-based communication generated by the sender;
   determining a focus of the communication generated by the sender based on the keywords identified from the parsing;
   formulating for display a topic for a publication based on criteria including a frequency of occurrence of one or more of the keywords in the parsed communications, a threshold level of the indications of sentiment that appear in the parsed communications, and a number of the communications containing one or more of the keywords; and
   displaying as selectable the topic in response to formulation of the topic for publication based on the threshold level of the indications of sentiment.

2. The method of claim 1 further comprising parsing communications conducted by the users across multiple applications, and classifying the parsed communications conducted by the users across multiple applications according to timestamp and thread.

3. The method of claim 1 further comprising:
   applying a weight to the keywords that are determined to be associated with the indications of sentiment, such that selection of the topic for publication is influenced by the keywords based on the corresponding weight.

4. The method of claim 1 further comprising:
   searching at least one data source for the keywords; and
   submitting, to the user, content corresponding to results of the searching.

5. The method of claim 1 further comprising:
   identifying, as a result of natural language processing applied to the communications conducted by the users, content that expounds on the topic for publication; and
   submitting, to the user, the content along with the topic for publication.

6. The method of claim 1 wherein the threshold level of the indications of sentiment include emoticons and predefined terms and phrases that express emotion.

7. The method of claim 1 further comprising, in response to selecting the topic, submitting the topic for publication to a publication application server that is configured to present the topic to a user when the user logs into a publication application of the publication application server.

8. A work-load optimized computing system, comprising:
   at least one hardware transactional memory; and
   a processing unit for executing computer readable instructions, the computer readable instructions including:
      parsing communications conducted among users through a plurality of different network communication applications, wherein the network communications comprise a dialog-based communication generated by a sender and dialog-based response communications received from recipients in reply to the communication generated by the sender;
      identifying keywords and indications of sentiment from the parsed communications wherein the indications of sentiment are identified from the dialog-based response communications and reflect a reaction to content expressed in the dialog-based communication generated by the sender;
      determining a focus of the communication generated by the sender based on the keywords identified from the parsing;
      formulating for display a topic for a publication based on criteria including a frequency of occurrence of one or more of the keywords in the parsed communications, a threshold level of the indications of sentiment that appear in the parsed communications, and a number of the communications containing one or more of the keywords;
      displaying as selectable the topic in response to formulation of the topic for publication based on the threshold level of the indications of sentiment.

9. The system of claim 8 wherein the instructions further include parsing communications conducted by the users across multiple applications, and classifying the parsed communications conducted by the users across multiple applications according to timestamp and thread.

10. The system of claim 8 wherein the method further comprises:
    applying a weight to the keywords that are determined to be associated with the indications of sentiment, such that selection of the topic for publication is influenced by the keywords based on the corresponding weight.

11. The system of claim 8 wherein the instructions further include:
    searching at least one data source for the keywords; and
    submitting, to the user, content corresponding to results of the searching.

12. The system of claim 8 wherein the instructions further include:
    identifying, as a result of natural language processing applied to the communications conducted by the users, content that expounds on the topic for publication; and
    submitting, to the user, the content along with the topic for publication.

13. The system of claim 8 wherein the threshold level of the indications of sentiment include emoticons and predefined terms and phrases that express emotion.

14. The system of claim 8 wherein the instructions further include, in response to selecting the topic, submitting the topic for publication to a publication application server that is configured to present the topic to a user when the user logs into a publication application of the publication application server.

15. A computer program product comprising a computer readable storage medium having program instructions embodied therewith, wherein the computer readable storage medium is not a transitory signal per se, the program instructions executable by a work-load optimized computing system to cause the work-load optimized computing system to perform a method comprising:
  parsing communications conducted among users through a plurality of different network communication applications, the network communications comprise a dialog-based communication generated by a sender and dialog-based response communications received from recipients in reply to the communication generated by the sender;
  identifying keywords and indications of sentiment from the parsed communications wherein the indications of sentiment are identified from the dialog-based response communications and reflect a reaction to content expressed in the dialog-based communication generated by the sender;
  determining a focus of the communication generated by the sender based on the keywords identified from the parsing;
  formulating for display a topic for a publication based on criteria including a frequency of occurrence of one or more of the keywords in the parsed communications, a threshold level of the indications of sentiment that appear in the parsed communications, and a number of the communications containing one or more of the keywords;
  displaying as selectable the topic in response to formulation of the topic for publication based on the threshold level of the indications of sentiment.

16. The computer program product of claim 15 wherein the program instructions executable by the processor further cause the computer processor to perform parsing communications conducted by the users across multiple applications, and classifying the parsed communications conducted by the users across multiple applications according to time-stamp and thread.

17. The computer program product of claim 15 wherein the method further comprises:
  applying a weight to the keywords that are determined to be associated with the indications of sentiment, such that selection of the topic for publication is influenced by the keywords based on the corresponding weight.

18. The computer program product of claim 15 wherein the program instructions executable by the processor further cause the computer processor to perform:
  searching at least one data source for the keywords; and
  submitting, to the user, content corresponding to results of the searching.

19. The computer program product of claim 15 wherein the program instructions executable by the processor further cause the computer processor to perform:
  identifying, as a result of natural language processing applied to the communications conducted by the users, content that expounds on the topic for publication; and
  submitting, to the user, the content along with the topic for publication.

20. The computer program product of claim 15 wherein the threshold level of the indications of sentiment include emoticons and pre-defined terms and phrases that express emotion.

* * * * *